United States Patent
Arai et al.

(10) Patent No.: US 9,421,712 B2
(45) Date of Patent: Aug. 23, 2016

(54) LASER JOINING METHOD

(71) Applicant: Hitachi, Ltd., Chiyoda-ku, Tokyo (JP)

(72) Inventors: Satoshi Arai, Tokyo (JP); Takeshi Senda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 226 days.

(21) Appl. No.: 14/363,174

(22) PCT Filed: Nov. 28, 2012

(86) PCT No.: PCT/JP2012/080667
§ 371 (c)(1),
(2) Date: Jun. 5, 2014

(87) PCT Pub. No.: WO2013/084758
PCT Pub. Date: Jun. 13, 2013

(65) Prior Publication Data
US 2014/0332157 A1    Nov. 13, 2014

(30) Foreign Application Priority Data

Dec. 9, 2011 (JP) .................................. 2011-269559

(51) Int. Cl.
*B29C 65/16* (2006.01)
*B29C 59/16* (2006.01)
(Continued)

(52) U.S. Cl.
CPC ............. *B29C 65/16* (2013.01); *B23K 26/0054* (2013.01); *B23K 26/324* (2013.01); *B29C 59/16* (2013.01); *B29C 65/1606* (2013.01);
(Continued)

(58) Field of Classification Search
CPC .... B29C 59/16; B29C 65/16; B29C 65/1606; B29C 65/1635; B29C 66/53461; B29C 66/73162; B29C 66/73161; B29C 66/0246; B29C 66/028; B29C 66/1122; B29C 66/30322; B29C 66/242; B29C 66/71; B29C 66/73366; B29C 66/73921; B29C 66/81267; B29L 2011/00; B23K 36/324; B23K 36/0054
See application file for complete search history.

(56) References Cited

U.S. PATENT DOCUMENTS

2003/0090562 A1* 5/2003 Kubota .............. B23K 26/0648
347/241
2005/0133638 A1* 6/2005 Hornby ................ F02M 51/005
239/585.1

(Continued)

FOREIGN PATENT DOCUMENTS

JP  62-46621 A    2/1987
JP  2003-181931 A  7/2003

(Continued)

OTHER PUBLICATIONS

Corresponding International Search Report dated Dec. 25, 2012, with English Translation (five (5) pages).

*Primary Examiner* — Daniel McNally
(74) *Attorney, Agent, or Firm* — Crowell & Moring LLP (57) ABSTRACT

The present invention provides a method for stably and robustly laser-welding transparent resins together without compromising transparency. Before laser welding, the joining surface of at least a second transparent resin is subjected to photooxidation, thereby reducing the laser transmittance without reducing the visible light transmittance. A laser beam in the ultraviolet region at a wavelength of 400 nm or less, or a laser beam with a pulse width of 10 ps or less is irradiated while the second transparent resin is pressurized to perform laser welding.

19 Claims, 11 Drawing Sheets

(51) Int. Cl.
*B23K 26/00* (2014.01)
*B23K 26/32* (2014.01)
*B29C 65/00* (2006.01)
*B29L 31/00* (2006.01)
*B29C 35/08* (2006.01)
*B29K 25/00* (2006.01)
*B29K 45/00* (2006.01)
*B29K 69/00* (2006.01)
*B29L 11/00* (2006.01)
*B29C 59/10* (2006.01)
*B29C 59/14* (2006.01)

(52) U.S. Cl.
CPC ........... *B29C65/1635* (2013.01); *B29C 66/028* (2013.01); *B29C 66/0246* (2013.01); *B29C 66/02245* (2013.01); *B29C 66/1122* (2013.01); *B29C 66/242* (2013.01); *B29C 66/30322* (2013.01); *B29C 66/53461* (2013.01); *B29C 66/71* (2013.01); *B29C 66/73161* (2013.01); *B29C 66/73162* (2013.01); *B29C 66/73366* (2013.01); *B29C 66/73921* (2013.01); *B29C 66/81267* (2013.01); *B23K 2203/30* (2015.10); *B29C 59/10* (2013.01); *B29C 59/14* (2013.01); *B29C 65/1609* (2013.01); *B29C 66/0016* (2013.01); *B29C 66/712* (2013.01); *B29C 66/73118* (2013.01); *B29C 66/73771* (2013.01); *B29C 66/73772* (2013.01); *B29C 66/73775* (2013.01); *B29C 66/73776* (2013.01); *B29C 66/73941* (2013.01); *B29C 66/9592* (2013.01); *B29C 2035/0827* (2013.01); *B29C 2035/0838* (2013.01); *B29K 2025/06* (2013.01); *B29K 2045/00* (2013.01); *B29K 2069/00* (2013.01); *B29K 2995/0027* (2013.01); *B29K 2995/0029* (2013.01); *B29L 2011/00* (2013.01); *B29L 2011/0016* (2013.01); *B29L 2031/756* (2013.01)

(56) References Cited

U.S. PATENT DOCUMENTS

| | | | |
|---|---|---|---|
| 2010/0084384 A1* | 4/2010 | Bovatsek | B23K 26/0617 219/121.64 |
| 2011/0110213 A1* | 5/2011 | Arai | G11B 7/1374 369/100 |

FOREIGN PATENT DOCUMENTS

| | | |
|---|---|---|
| JP | 2004-1071 A | 1/2004 |
| JP | 2005-70245 A | 3/2005 |
| JP | 2006-15405 A | 1/2006 |
| JP | 2006-341375 A | 12/2006 |
| JP | 2007-230051 A | 9/2007 |
| JP | 2008-23911 A | 2/2008 |
| JP | 2010-64325 A | 3/2010 |

* cited by examiner

LASER JOINING METHOD

TECHNICAL FIELD

The present invention relates to a laser joining method for welding light-translucent organic materials (such as thermoplastic resins, thermosetting resins, and the like) to each other, or welding a light-translucent organic material and a light-translucent inorganic material to each other.

BACKGROUND ART

The thermoplastic resins exhibit excellent processing characteristics and high shape degree-of-freedom. Accordingly, the thermoplastic resins are widely used for common industrial usages such as automobiles, electrical appliances, medical-care-related/bio-related appliances, and the like. Actually, the thermoplastic resins have prevailed up to such an extent that it can be said that there exists no field where the thermoplastic resins are not used. Namely, the thermoplastic resins have already become everyday-used familiar materials. At the beginning, the thermoplastic resins had been utilized as the alternatives for natural raw materials such as lumbers, papers, and the like. Nowadays, however, special products that cannot be produced without using the plastic materials are developed in large numbers. In view of this situation, if an optimum material is made full use of for the design and development using an optimum processing method, there exists a possibility that a never-before-possible new product will be able to be created and produced.

In particular, in accompaniment with the trend of product's structural complication and product's low-cost implementation in recent years, the design is performed where merits of the thermoplastic resins are made full use of. Also, the secondary-processing technologies are becoming important similarly. Of these secondary-processing technologies, attention has been focused on the laser welding by the prevalence of semiconductor lasers. The laser welding is a very clean joining technology that results in only a small extent of occurrence of the resin's burr. Accordingly, the research is also underway vigorously with medical-care-related/bio-related parts employed as the research target. Moreover, the features of the laser welding are as follows: Namely, the accuracy is high, and the distortion is small. This feature is made possible, because only the periphery of a target area, i.e., the laser-light irradiation area, is heated in a concentrated and rapid manner. Also, the welding/joining of complicated three-dimensionally-shaped objects or large-sized products is made possible by the scanning performed with laser light. Also, the product's low-cost implementation can be accomplished by a reduction in the number of the processing steps or the number of the parts. In general, however, a transparent resin and a black resin are used in the laser welding. As a result, the laser welding of mutually transparent resins is difficult to accomplish.

As the laser welding of mutually transparent resins, in PATENT LITERATURE 1, the explanation has been given concerning the following technique: Namely, a very thin transparent film, which exhibits a laser-light-absorbing absorption property, and which contains similar constituents to those of mutually transparent resin members, is caused to exist between these mutually transparent resin members. In this state, the laser irradiation is performed. This laser-irradiation operation makes it possible to weld even the mutually transparent resin members to each other. In PATENT LITERATURE 2, the explanation has been given regarding the following technique: Namely, toner or paint is caused to adhere onto one side of each of the mutually transparent resin members in accordance with a predetermined pattern. In this state, the laser irradiation is performed. This laser-irradiation operation makes it possible to weld even the mutually transparent resin members to each other. In PATENT LITERATURE 3, the disclosure has been made concerning the following technique: Namely, a concave/convex-portions surface is formed by roughing one side of the joining portion between the mutually transparent resin members. In this state, the laser irradiation is applied to this concave/convex-portions surface. This laser-irradiation operation allows even the mutually transparent resin members to be welded to each other.

CITATION LIST

Patent Literature

PATENT LITERATURE 1: JP-A-2003-181931
PATENT LITERATURE 2: JP-A-2004-1071
PATENT LITERATURE 3: JP-A-2006-15405

SUMMARY OF INVENTION

Technical Problem

In the technique disclosed in the above-described PATENT LITERATURE 1, the infrared-rays-absorbing transparent film is used. Nevertheless, the absorption ratio of this film is low, i.e., 5% to 8%, and the thickness of this film exists. As a result, it has been found that the stable heat conduction does not occur, and that the stable welding is difficult to accomplish. Also, the solid film is caused to exist between the transparent resin members. As a result, the workability is bad, and the members are partially deformed when deployed, and thus a clearance is caused to occur therebetween. Consequently, there has also existed a problem that the joined state does not become stabilized.

In the technique disclosed in the above-described PATENT LITERATURE 2, the explanation has been given such that the laser irradiation is performed in the state where the toner or paint is evaporated onto the surface. However, the adhesive quality of the toner or paint onto the transparent resins is low. As a result, it has been found in many cases that, even if, for example, one and the same-type material is used for the transparent resins, the entire strength is weak. Moreover, the joined state becomes significantly varied, depending on the material quality transferred, the thickness of the solid intermediate material, and the degree of planarization. As a result, the management before the joining is difficult to perform, and thus its improvement has been longed for.

In the technique disclosed in the above-described PATENT LITERATURE 3, the welding is made possible by causing the surface microscopic concave/convex portions to absorb the laser light. The absorption ratio, however, becomes significantly varied, depending on the extent of existence of the surface concave/convex portions. As a result, it has been difficult to accomplish the stable welding only by the effect of this laser absorption. Furthermore, it has been found that it is also difficult to form the welded portion in a precise size. This is because the significant variation occurs in the absorption ratio.

It is an object of the present invention to solve the above-described problems, and to laser-weld mutually transparent resins to each other in a stable and high-strength manner under a condition that their transparent state is unchanged.

Solution to Problem

The inventor et al. have found that the stable and high-strength welding of mutually transparent resins is made possible by performing the following processings: Namely, before laser-light irradiation, an ultraviolet-light-used photooxidation processing (such as UV ozone processing, excimer processing, or the like) is applied onto the welding interfacial-surface side of at least the transparent resin that is opposite to the side of the material which permits the laser light to pass therethrough. Moreover, in a state where the welding interfacial surface is pressurized, the welding interfacial surface is irradiated with ultraviolet continuous-wave or pulse-wave laser light whose wavelength is equal to 400 nm or less, or ultrashort pulse-wave laser light whose pulse width is equal to 10 ps or less. Also, it has become apparent that the present invention is capable of addressing not only the welding of resins of one and the same-type material, but also the welding of resins of different-type materials.

In the present invention, in order to solve the above-described problems, the photooxidation processing is applied to a transparent resin, thereby lowering the laser transmittance while maintaining the visible-light transmittance. Furthermore, a joining-target member is laser-joined to this transparent resin.

Advantageous Effects of Invention

According to the present invention, it becomes possible to laser-weld mutually transparent thermoplastic resins to each other in a stable and high-strength manner under a condition that their transparent state is unchanged. Also, it is simultaneously possible to enhance the adhesive quality of interfacial surface of the joining portion. As a result, it also becomes possible to laser-weld a combination of the resins of different-type materials.

BRIEF DESCRIPTION OF THE DRAWINGS

FIGS. 2($a$) and ($b$) are diagrams for illustrating results of the optical transmittances at each wavelength in a case where the photooxidation processing is carried out to a COP resin.

FIGS. 3($a$) and ($b$) are diagrams for illustrating results of the optical transmittances at each wavelength in a case where the photooxidation processing is carried out to a COC resin.

FIGS. 4($a$) and ($b$) are diagrams for illustrating results of the optical transmittances at each wavelength in a case where the photooxidation processing is carried out to a PC resin.

FIGS. 5($a$) and ($b$) are diagrams for illustrating results of the optical transmittances at each wavelength in a case where the photooxidation processing is carried out to a PS resin.

FIGS. 10($a$) to ($e$) are diagrams for illustrating an embodiment of the laser welding method of the present invention for forming a three-layered joined structure of the transparent thermoplastic resins.

FIGS. 11($a$) to ($d$) are diagrams for illustrating another embodiment of the laser welding method of the present invention for forming the three-layered joined structure of the transparent thermoplastic resins.

DESCRIPTION OF EMBODIMENTS

Hereinafter, the explanation will be given below concerning embodiments of the present invention. The transparent thermoplastic resins that are employed and used in the present invention are classified into crystalline resins and non-crystalline resins. In particular, the transparent thermoplastic resins employed here are transparent thermoplastic resins through which the transmittances of visible light and infrared-region light, whose wavelengths are equal to 400 nm or more, are equal to 70% or more. The transparent thermoplastic resins mentionable as the non-crystalline resins are as follows: Polystyrene (PS), polycarbonate (PC), polyarylate (PAR), polymethyl metaacrylicacid methyl (PMMA), cycloolefin polymer (COP), cycloolefin copolymer (COC), polysulfone (PSF), and polyethersulfone (PES). The transparent thermoplastic resins mentionable as the crystalline resins are as follows: Polyethylene (PE), polypropylene (PP), polyethylene terephthalate (PET), polyamide (PA), and the like. Also, the transparent thermoplastic resins that are also employable are transparent thermoplastic resins containing alloy materials and fillers of these crystalline and non-crystalline resins, or transparent thermoplastic resins of special grade. As the form of the resins, not only generally molded products but also films are employable. Moreover, not only the thermoplastic resins but also thermosetting resins are employable.

Also, the transparent resins will be employed and used in the following embodiments. The present invention, however, is not limited thereto. Namely, the resins are permitted to have a little amount of color such as semi-transparency, as long as the resins exhibit light-translucency. The reason for this is as follows: Namely, even if the resins are semi-transparent, the present invention can prevent the visible-light transmittance from being changed. This condition does not change the color of the visible light, thereby allowing successful implementation of the effects of the present invention.

The conditions of the laser welding are laser-spot size, laser power, laser irradiation time, and applied pressure. These laser-welding conditions are determined after consideration is given to the transmittance/absorptance and heat conductivity of a raw material at the laser irradiation wavelength. The laser light-sources that are employable for the laser welding are laser light-sources for emitting laser light which is equipped with the ultraviolet-region wavelength. The other laser light-sources employable in this case are semiconductor laser, excimer laser, Nd:YAG laser and Nd:YVO4 laser for performing pulse oscillation and allowing the emission of high-order harmonics wave, and the like. Also, even if the ultraviolet-region laser light is not generated by the single laser light-source, a nonlinear absorption is caused to occur in a thermoplastic resin when laser light whose pulse width is equal to 10 pico seconds or shorter enters the thermoplastic resin. On account of this phenomenon, Ti:Sahhire laser and the like are also employable.

The intensity distribution of a laser light-source can be set at various intensity distributions such as Gaussian-shaped, top-hat-shaped, and ring-shaped intensity distributions, depending on the lens attached to the light-source. It is desirable, however, to employ a laser light-source that uses the top-hat-shaped intensity distribution, or the ring-shaped intensity distribution where the intensity at the central portion is higher than 50% of the maximum value. The reason for this employment is a point that the top-hat-shaped or ring-shaped intensity distribution makes it easy to uniform the welded state.

Also, it is advisable to delipidate a transparent thermoplastic resin to be used once at a stage before the welding using alcohol or the like. Incidentally, when carrying out an oxidation processing to the transparent thermoplastic resin, it is necessary to perform the delipidation before the oxidation processing.

The implementation of the laser welding requires execution of the pressurization. Accordingly, it is advisable to employ a transparent material as the pressurization member to be used for the pressurization. If, however, consideration is given to sufficient heat-liberation of the material on the laser-irradiation side, it is desirable to employ high-heat conductivity glass in particular. Furthermore, it is desirable to apply the mirror finish beforehand onto the surface of the pressurization member.

Embodiment 1

Figure 1:
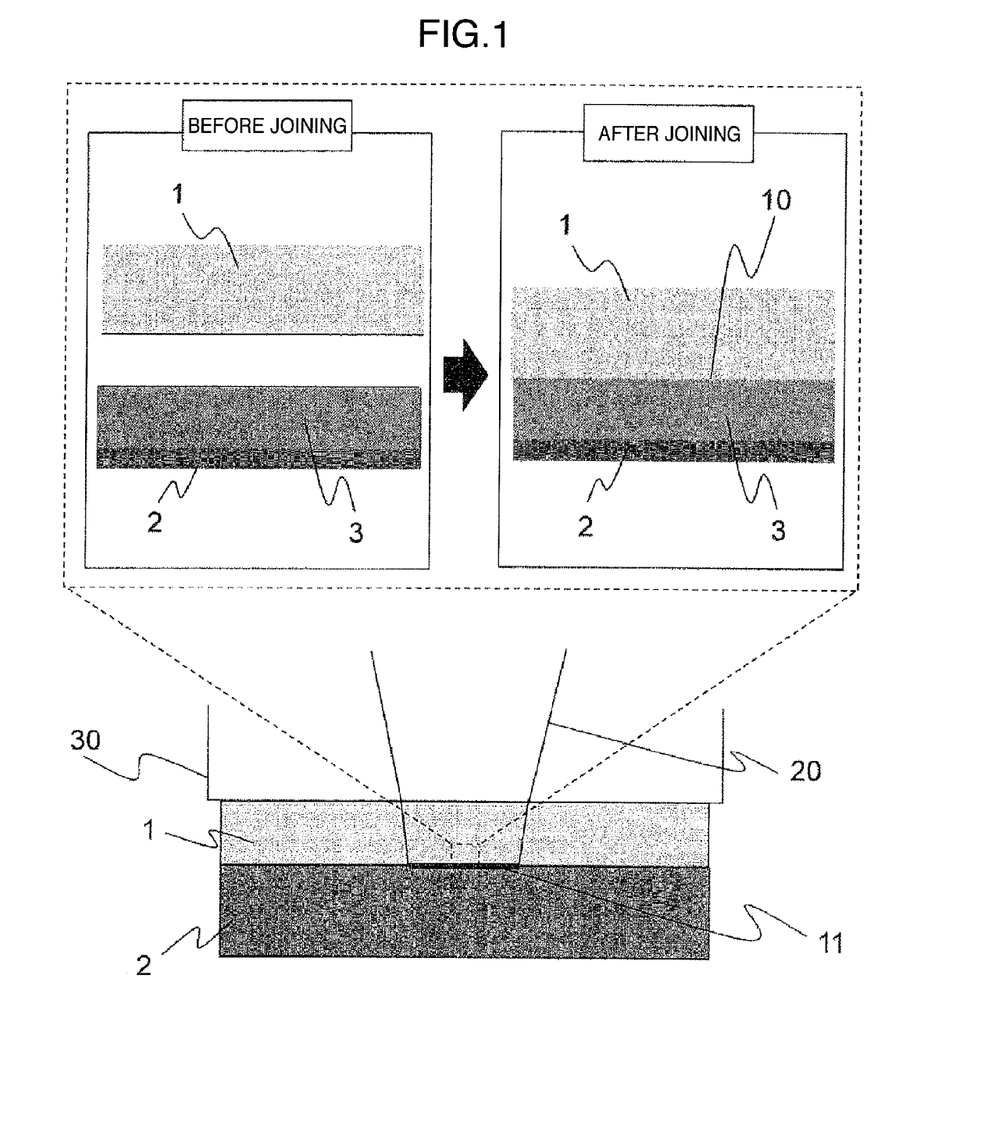
FIG. 1 is a diagram for illustrating an embodiment of the laser welding method of the present invention for laser-welding mutually transparent thermoplastic resins to each other.

FIG. 1 is a plan view for illustrating an embodiment of the laser welding method of the present invention for laser-welding mutually transparent thermoplastic resins to each other. In the present embodiment, there are provided a first transparent thermoplastic resin 2 through which laser light 20 passes, and a second transparent thermoplastic resin 1 that is the same as or different from the first transparent thermoplastic resin 2. Before the laser welding, a photooxidation processing is applied onto the joining interfacial-surface side of at least the second transparent thermoplastic resin 1. Moreover, the mutually transparent resins are laser-welded by irradiating the joining interfacial surface with the 400-nm-or-less-wavelength ultraviolet-region laser light 20, or the 10-ps-or-less-pulse-width laser light 20 in a state where the joining interfacial surface is pressurized.

It is desirable to use, as the photooxidation processing, an ultraviolet-light-used photooxidation processing such as UV ozone processing, excimer UV processing, or the like. This photooxidation processing forms a photooxidized layer 3 newly, thereby dramatically enhance the absorptance of the 400-nm-or-less-wavelength light. As a light-source that is to be dedicated to the photooxidation processing, whatever form of lamp, LED, and laser is selectable. Incidentally, if the thickness of the photooxidized layer 3 is too thick, it becomes a cause for a lowering in the strength. Accordingly, the 50-nm-or-less-thickness photooxidized layer 3 is desirable. Also, in the case of the laser welding, the welding is made implementable locally only in an area that is irradiated with the laser light 20. Here, however, the photooxidation processing is locally carried out in advance, and the locally-photooxidation-processing-carried-out area is irradiated with the laser light whose laser spot is wider than this area. This method allows only the welding-wished area to be accurately joined, even if the position of the laser light-source shifts to some extent. On account of this, depending on the cases, it is desirable to carry out the photooxidation processing locally after a mask or the like is set up.

FIGS. 2(a) and (b) are diagrams for illustrating results of the optical transmittances in a case where the UV ozone processing is carried out to the cycloolefin polymer (COP). In particular, FIG. 2(a) illustrates the transmittance of light whose wavelength is equal to 305 nm to 1090 nm. Meanwhile, FIG. 2(b), which is an enlarged diagram of FIG. 2(a), illustrates the transmittance of the light whose wavelength is equal to 305 nm to 410 nm. Also, the explanation will be given below regarding a case where, as another oxidation processing, an oxygen plasma processing is carried out to the cycloolefin polymer.

Figure 2:
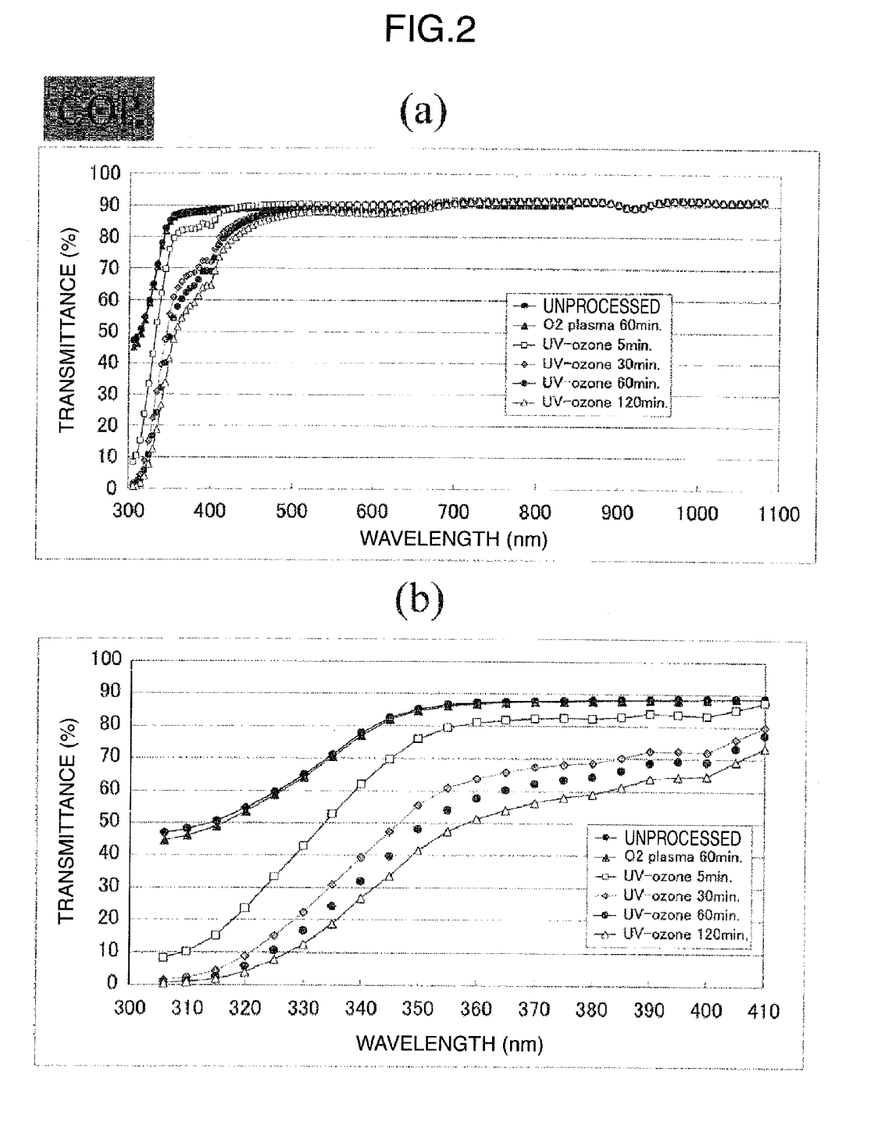
Figure 3:
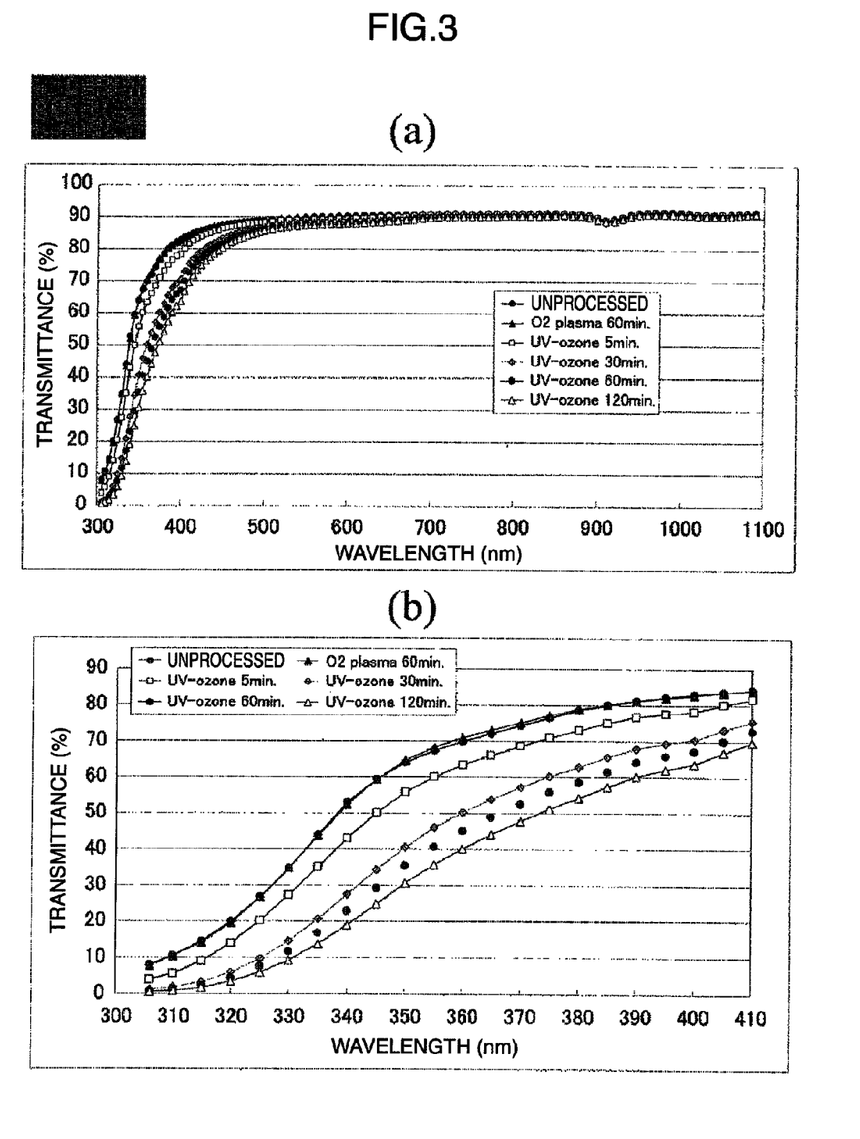
Figure 4:
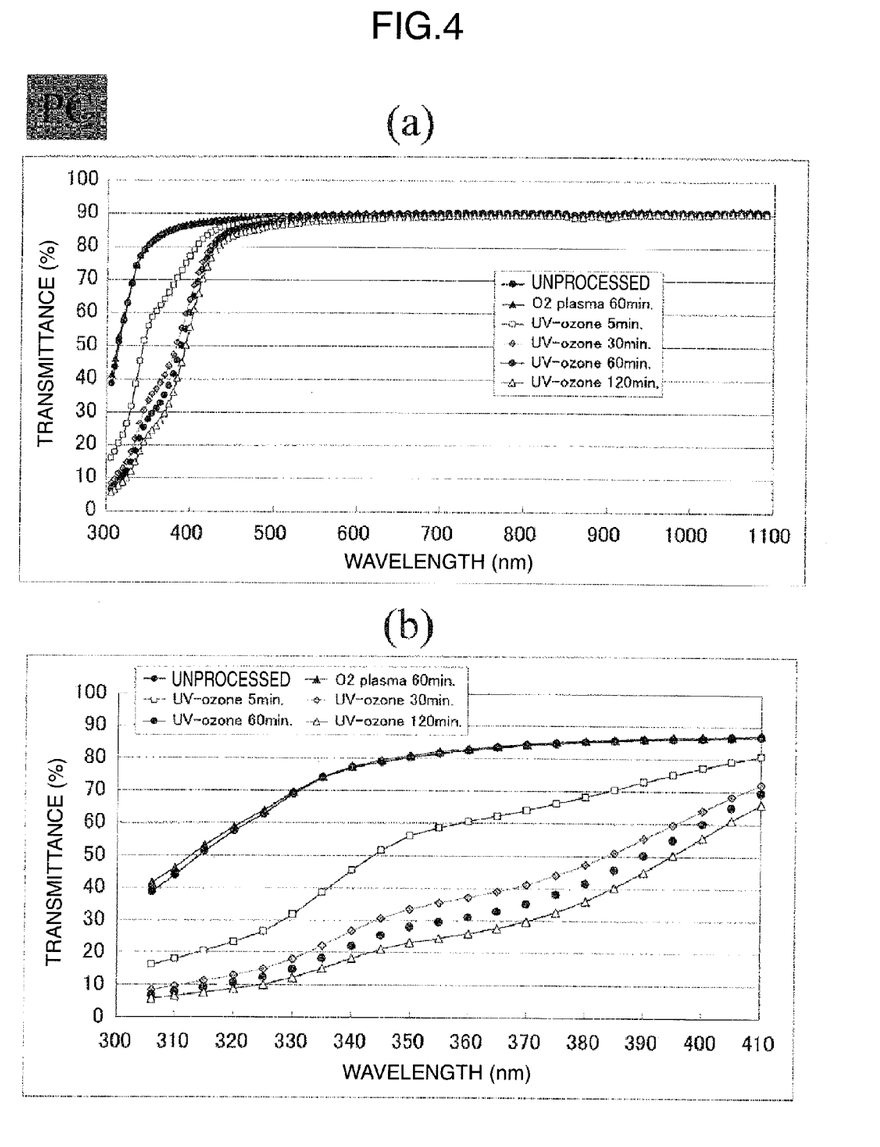
Figure 5:
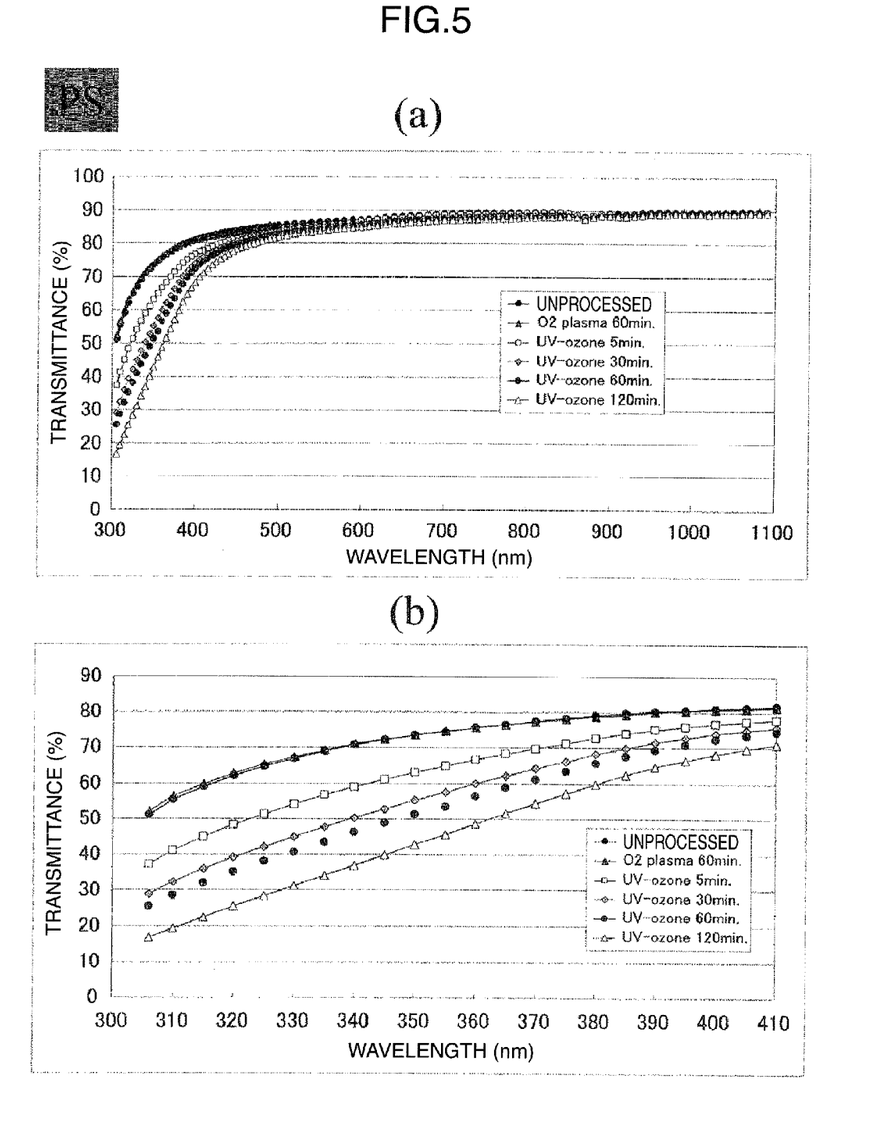

The carry-out of the UV ozone processing to the cycloolefin polymer has resultantly indicated the following fact: Namely, the absorptance, i.e., the transmittance of the light in the ultraviolet region is tremendously enhanced; whereas the absorptance of the light in the visible and infrared regions does not change so much. Moreover, it has been found that increases in the UV ozone processing time give rise to more enhancements in the absorptance of the light in the ultraviolet region. Also, in the oxygen plasma processing (which is another oxidation processing), it has been found that the absorptance, i.e., the transmittance does not change. FIG. 2, FIG. 3, and FIG. 4 indicate basically the same results in association with the cycloolefin copolymer (COC), polycarbonate (PC), and polystyrene (PS), respectively. These results have made it clear that these transparent resins exhibit basically the same tendency as that of the cycloolefin polymer (COP). Furthermore, it has been found that the transmittance of 305 nm-or-less-wavelength light is also enhanced. Consequently, the execution of the UV ozone processing makes it possible to tremendously enhance the absorptance of only the light in the ultraviolet region into the transparent resins without significantly changing the absorptance of the light in the visible and infrared regions. On account of this fact, depending on the types of the resin materials, the transparency can be ensured even if the laser welding is performed in a state where the entire-surface photooxidation processing is carried out without carrying out the local-area photooxidation processing. Namely, even after the photooxidation processing is carried out, the visible light exhibits the 70%-or-more transmittance in the case of the transparent resins. Even in the case of the semi-transparent resins, the visible light exhibits the 70%-or-more transmittance as compared with the transmittance exhibited before the photooxidation processing.

The ultraviolet-region laser light, which is effective as the incident laser light 20, corresponds to the high-order harmonics wave that is emitted from the laser light-source of ultraviolet semiconductor laser, infrared semiconductor laser, solid laser, or the like. In this case, either the continuous-wave laser light or the pulse-wave laser light is employable. Also, performing the irradiation with the 10-ps-or-less-pulse-width laser light causes the third-order nonlinear optical effect to occur, thereby making it likely that the multi-photon absorption will occur. On account of this fact, when using the 10-ps-or-less-pulse-width laser light, the wavelength of the laser light 20 is not required to be within the ultraviolet region.

The laser welding is caused to occur as follows: Namely, the second transparent thermoplastic resin 1, whose optical absorbability is enhanced by the photooxidation processing, is melted or softened by the laser-light irradiation. Moreover, the melted or softened resin 1 adheres closely onto or becomes wet with the first transparent thermoplastic resin 2, which causes the laser welding to occur. Performing the photooxidation processing as the pre-processing increases or newly generates polar groups on the surfaces of the first and second transparent thermoplastic resins. Then, in accompaniment therewith, surface energies of the resins are increased. On account of this fact, when joining the mutually transparent thermoplastic resins of different-type materials with each other, it becomes necessary to set the following energy relationship: The surface energy of the first transparent thermoplastic resin 2≥the surface energy of the second transparent thermoplastic resin 1. This setting is necessary even if the photooxidation processing is carried out to the second transparent thermoplastic resin 1 in order to enhance its optical absorbability.

In the mutually transparent thermoplastic resins of one and the same-type material, however, these resins are equipped with the miscibility. As a result, if the laser power is increased, the transparent thermoplastic resin 1 becomes fluidized, and then these resins are mixed with each other. Accordingly, even if the energy relationship therebetween becomes inverted, this inversion exerts no significant bad influence on the welding property.

Furthermore, when welding the mutually transparent thermoplastic resins of different-type materials to each other, it is desirable to reset the relationship into the following combination: The glass transition temperature or melting point of the second transparent thermoplastic resin 1≥the glass transition temperature or melting point of the first transparent thermoplastic resin 2. Generally speaking, in the case of the non-crystalline resins, only the glass transition temperature exists, and no definite melting point exists. Meanwhile, in the case of the crystalline resins, both the glass transition temperature and the melting point exist definitely. In the laser welding, it is desirable to satisfy the above-described relationship in such a manner that the glass transition temperature is taken into consideration in the case of the non-crystalline resins, and that the melting point is taken into consideration in the case of the crystalline resins.

Also, in the present embodiment, the mutually transparent resins are joined with each other. The second transparent resin 1, onto which the photooxidation processing is applied, is required to be a resin. Instead of the first transparent resin 2, however, it is also allowable to employ the other light-translucency-equipped materials such as glass, semiconductor, mineral, and the like.

Incidentally, in the present embodiment, the laser-light irradiation is performed from the side of the first transparent thermoplastic resin 2. The laser-light irradiation, however, may also be performed from the side of the second transparent thermoplastic resin 1. The reason for this is as follows: Namely, only the thin area that is close to the joining surface is subjected to the photooxidation processing. As a result, the laser light is absorbed sufficiently into the area near the joining surface, even if the laser-light irradiation is performed from the side of the second transparent thermoplastic resin 1.

Embodiment 2

Figure 6:
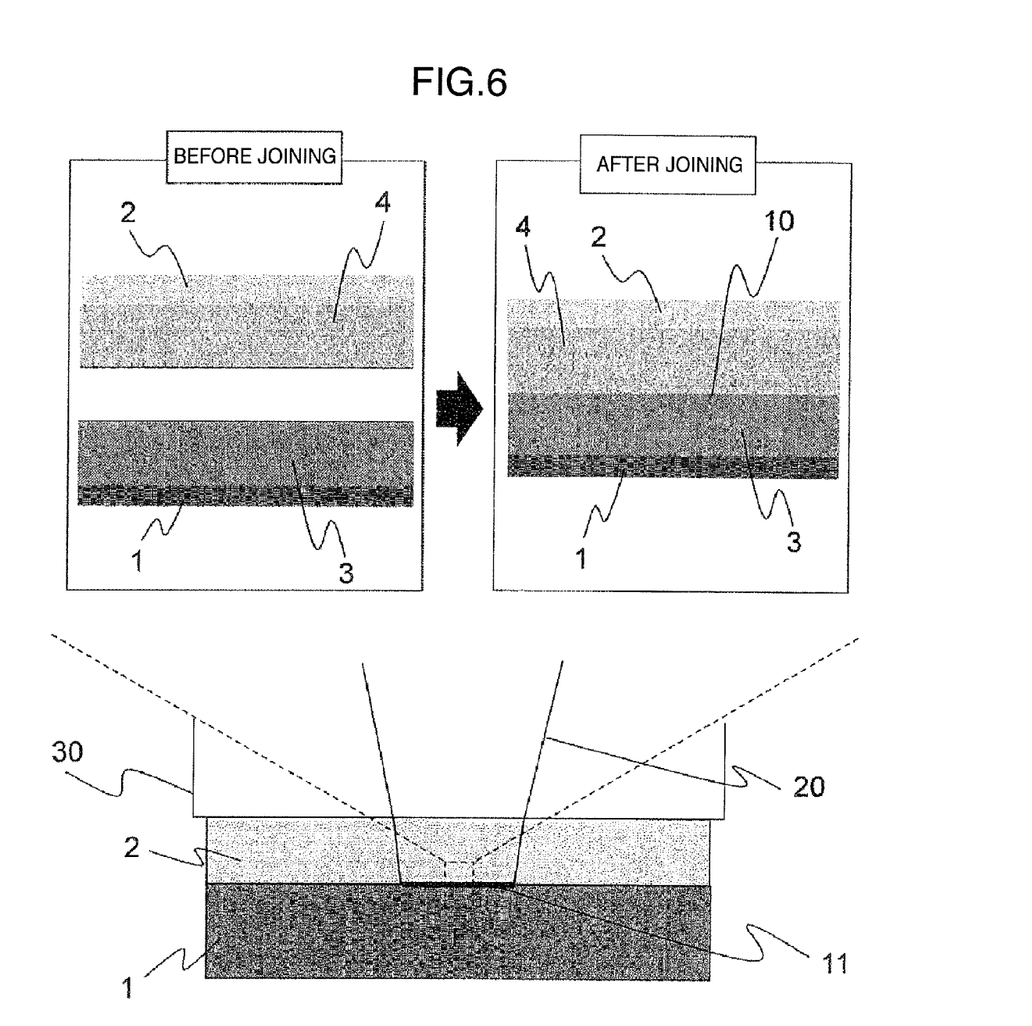
FIG. 6 is a diagram for illustrating another embodiment of the laser welding method of the present invention for laser-welding the mutually transparent thermoplastic resins to each other.

FIG. 6 is a plan view for illustrating another embodiment of the laser welding method of the present invention for laser-welding mutually transparent thermoplastic resins to each other. In the present embodiment, the following processing is added to the first embodiment: Namely, before the laser welding, an oxidation processing is applied onto the first transparent thermoplastic resin 2 (through which the laser light 20 passes) as well. When a thermoplastic resin is molded, a shrinkage is often produced. Then, if a clearance between the transparent thermoplastic resins becomes somewhat large due to this shrinkage, this somewhat-large clearance makes it unlikely that these resins will adhere closely to each other easily. This gives rise to a welding failure in some cases. In that case, the optical absorptance is increased up to a certain extent by applying the oxidation processing onto the first transparent thermoplastic resin 2 as well. As a result, the first transparent thermoplastic resin 2 is expanded by the resultant heat absorption. This heat expansion of the first transparent thermoplastic resin 2 can make it likely that the resin 2 will adhere closely to the second transparent thermoplastic resin 1 easily.

The present technique is an effective method for both the transparent thermoplastic resins of one and the same-type material and the transparent thermoplastic resins of different-type materials. It is desirable, however, to set the following relationship: The optical absorptance of the second transparent thermoplastic resin 1>the optical absorptance of the first transparent thermoplastic resin 2. Nevertheless, when welding the mutually transparent thermoplastic resins of different-type materials to each other, it is necessary to set the relationship: The surface energy of the first transparent thermoplastic resin 2≥the surface energy of the second transparent thermoplastic resin 1. Accordingly, it also becomes necessary to determine the processing time and intensity with the optical absorptance taken into consideration. Depending on a combination of the transparent thermoplastic resins to be welded, however, the following drawback occurs: Namely, if priority is given to the increase in the optical absorptance of the second transparent thermoplastic resin 1, the surface energy of the second transparent thermoplastic resin 1 becomes too large. This gives rise to a worsening of the welded state in some cases. In that case, as the oxidation processing to be applied onto the first transparent thermoplastic resin 2, it is desirable to carry out an other-than-photooxidation-processing, optical-absorptance-unchanging, and surface-energy-increasing-capable plasma processing, corona processing, or laser processing using an other-than-ultraviolet-region wavelength. In various types of combinations, the carry-out of the processing like this makes it possible to set the relationship: The surface energy of the first transparent thermoplastic resin 2≥the surface energy of the second transparent thermoplastic resin 1. Here, this setting is made possible after the optical absorptance of the second transparent thermoplastic resin 1 in the ultraviolet region is increased tremendously. Incidentally, in the case of the present combination, the first transparent thermoplastic resin 2 is the side of the resin through which the laser light 20 passes.

Embodiment 3

Figure 7:
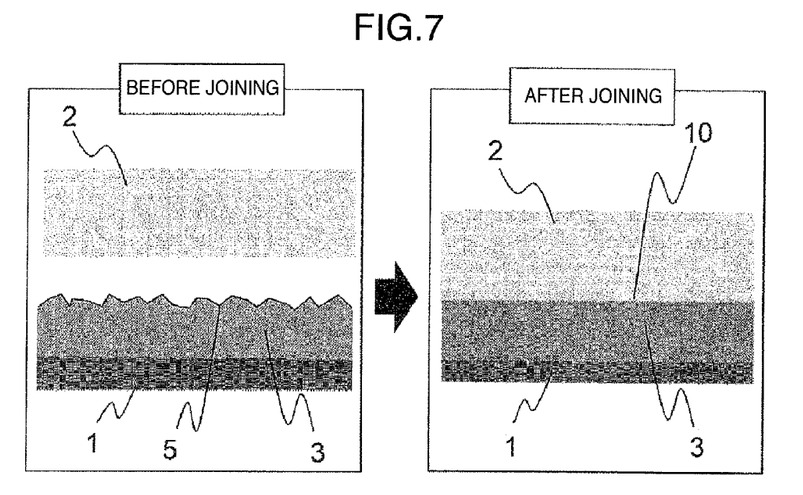
FIG. 7 is a diagram for illustrating still another embodiment of the laser welding method of the present invention for laser-welding the mutually transparent thermoplastic resins to each other.

FIG. 7 is a plan view for illustrating still another embodiment of the laser welding method of the present invention for laser-welding mutually transparent thermoplastic resins to each other. In the first embodiment, before the laser welding, the photooxidation processing is applied onto the joining interfacial-surface side of the second transparent thermoplastic resin 1. Meanwhile, in the present embodiment, in addition to the first embodiment, microscopic concave/convex portions 5 are formed on the joining interfacial-surface side. Then, the mutually transparent resins are laser-welded to each other. The formation of the microscopic concave/convex portions makes it possible to increase the optical absorptance of the second transparent thermoplastic resin 1 even further. The microscopic concave/convex portions 5 can be formed by utilizing the transfer of metallic mold to which surface texturing is applied, and carrying out sandblast processing, sandpaper processing, laser processing, and chemical-solution processing. After that, it is desirable to apply the photooxidation processing. Depending on the type of the transparent thermoplastic resin, however, both the photooxidized layer 3 and the microscopic concave/convex portions 5 can be formed by carrying out the ultraviolet-region laser processing alone. Incidentally, it is desirable to set the radius of the microscopic concave/convex portions at 5 μm or less.

Figure 8:
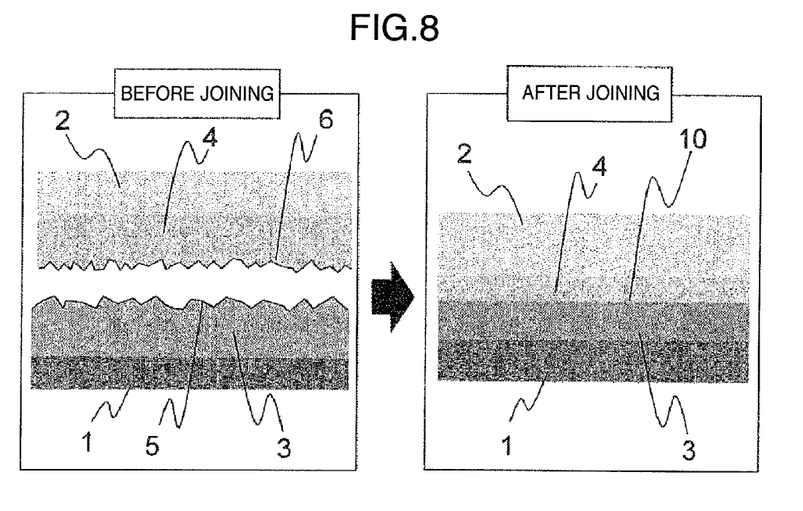
FIG. 8 is a diagram for illustrating still another embodiment of the laser welding method of the present invention for laser-welding the mutually transparent thermoplastic resins to each other.

Also, as illustrated in FIG. 8, microscopic concave/convex portions 6 are formed on the joining interfacial-surface side of the first transparent thermoplastic resin 2 as well. This processing becomes effective in the point of being capable of making it likely that the resin 2 will adhere closely to the resin 1 easily at the time of the heat expansion. In addition to the formation of the microscopic concave/convex portions 5 and 6 described so far, the co-use of the microscopic concave/convex portions 5 and 6 and the oxidation processing applied onto the first transparent thermoplastic resin 2 becomes a very effective method. Nevertheless, even if the co-use of the microscopic concave/convex portions 5 and 6 and the oxidation processing is performed, it is still desirable to set the relationship: The optical absorptance of the second transparent thermoplastic resin 1>the optical absorptance of the first transparent thermoplastic resin 2.

Embodiment 4

Figure 9:
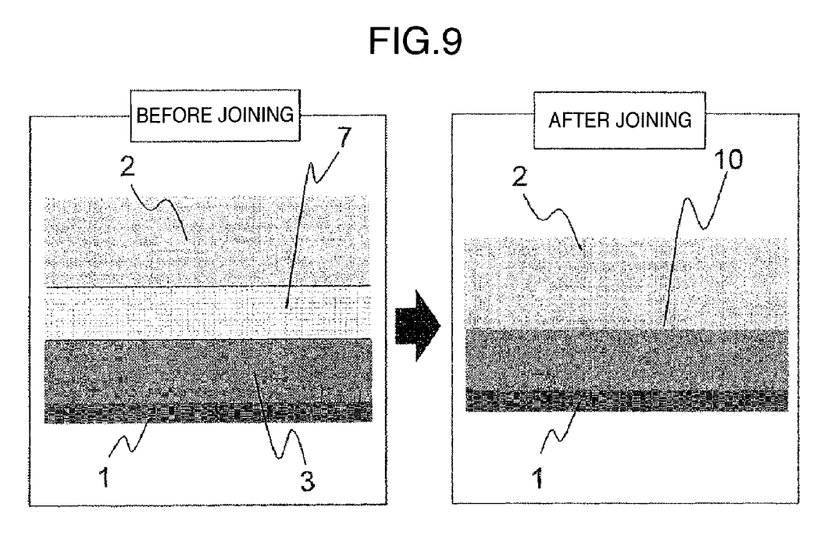
FIG. 9 is a diagram for illustrating still another embodiment of the laser welding method of the present invention for laser-welding the mutually transparent thermoplastic resins to each other.

FIG. 9 is a plan view for illustrating still another embodiment of the laser welding method of the present invention for laser-welding mutually transparent thermoplastic resins to each other. In the first embodiment, before the laser welding, the photooxidation processing is applied onto the joining interfacial-surface side of the second transparent thermoplastic resin 1. Meanwhile, in the present embodiment, in addition to the first embodiment, a liquid-state intermediate member 7 is deployed between the first transparent thermoplastic resin 2 and the photooxidized layer 3. Then, in the state where the member 7 is deployed therebetween, the mutually transparent resins are laser-welded to each other by being pressurized. When a clearance is formed between the resins by a shrinkage or the like at the time of the molding, the air exists within the clearance formed. The heat conductivity of the air is equal to, e.g., 0.032 W/mK at 100° C., which is exceedingly low. Accordingly, there occurs no sufficient heat conduction to the first transparent thermoplastic resin 2, if the optical-absorbability-equipped second transparent thermoplastic resin 1 is not brought into contact with the first transparent thermoplastic resin 2 by the heat expansion of the resin 1 at the time of the laser-light irradiation. As a result, the optical-absorbability-equipped second transparent thermoplastic resin 1 is heat-decomposed by its own abnormal heat-liberation. This gives rise to the occurrence of a welding failure. Also, even when the close adherence therebetween is implemented, this close adherence results in an insufficient welding if it is implemented only locally.

On the other hand, the heat conductivity of water is equal to 0.67 W/mK at 80° C., which is about 20 times higher as compared with that of the air. Accordingly, the employment of water as the intermediate member 7 can make it likely that the heat conduction to the first transparent thermoplastic resin 2 will occur easily at the time of the heat expansion of the optical-absorbability-equipped second transparent thermoplastic resin 1. Consequently, it is desirable to employ, as the intermediate member 7, a liquid-state substance whose viscosity is equal to 1000 m Pa·s or less, and whose heat conductivity is equal to at least 0.2 W/mK or more. Concretely, the substances preferable as the intermediate member 7 are substances that volatize at the time of laser-light irradiation. Examples of them are not only pure water, but also low-flammability solvent such as alcohol, and primer, adhesive agent, and the like. Also, the deployment of the intermediate member 7 between the resin 2 and the layer 3 makes it possible to reduce influences of the reflection on the joining interfacial surface of the first transparent thermoplastic resin 2, thereby allowing implementation of the more effective welding as well.

As having been explained so far, the deployment of the intermediate member 7 therebetween is a robust method for making it possible to decrease the ratio of a reduction in the welding strength when a clearance is formed. Moreover, the co-use of this method and the methods explained in the second and third embodiments becomes a more effective method. Also, because of the implementation of the close adherence, the in-advance co-use of the intermediate member 7 brings about a merit of being capable of preventing a position shift from occurring between the resins when they are pressurized. In that case, a point of being capable of determining the position in advance before they are pressurized becomes advantageous in some cases, depending on a processing step concerned. Incidentally, the present invention provides the methods that are specifically effective in a case where it is difficult to implement and ensure the close adherence based on the pressurization. An example of such a case is that a low-rigidity film is employed as the form of the thermoplastic resins.

Embodiment 5

Figure 10:
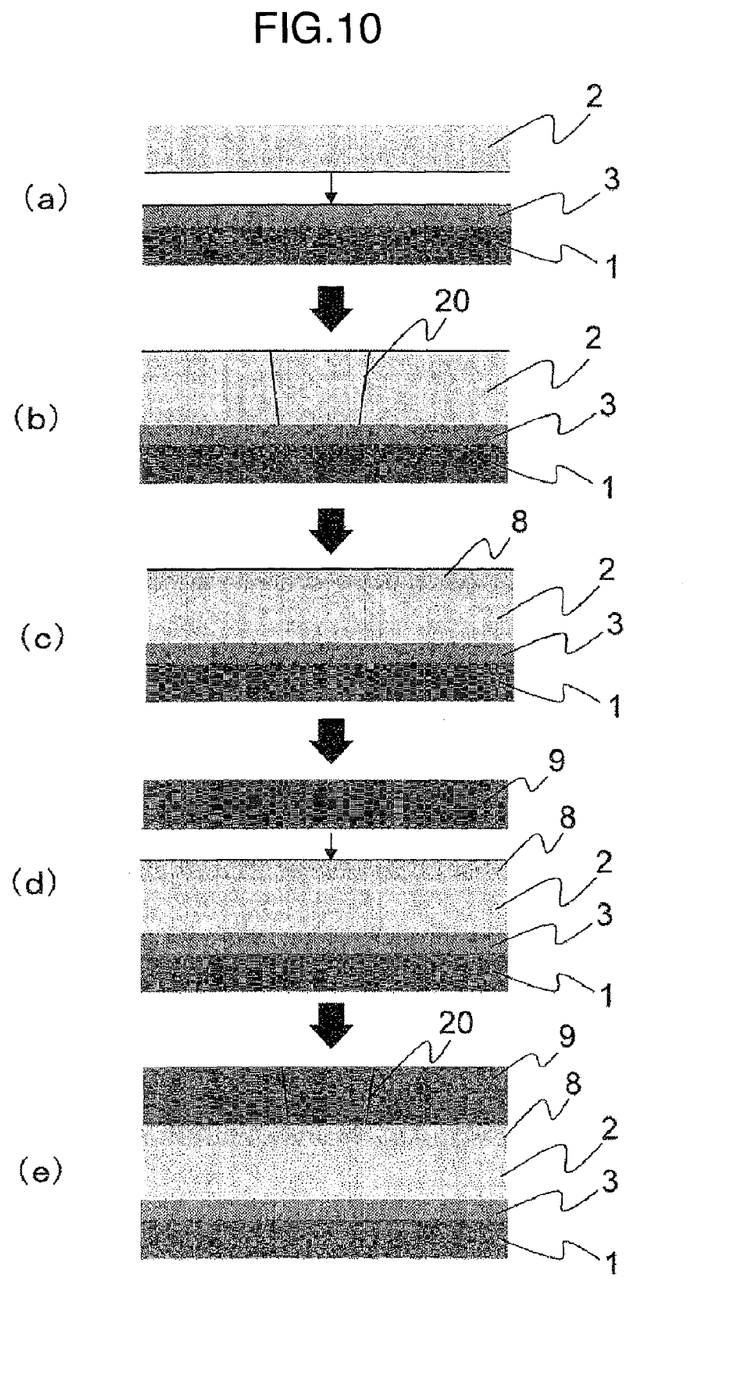

FIG. 10 is a plan view for illustrating still another embodiment of the laser welding method of the present invention for laser-welding mutually transparent thermoplastic resins to each other. Concretely, FIG. 10 illustrates an embodiment of the laser welding method for forming a three-layered joined structure of the transparent thermoplastic resins.

The first transparent resin 2 is caused to adhere closely to the second transparent resin 1 onto which the photooxidation processing is applied (FIG. 10(a)). Moreover, these transparent resins are welded by irradiating the closely-adhering portion with the ultraviolet-region laser light (FIG. 10(b)). After that, the photooxidation processing is applied onto the opposite surface to the joined surface of the first transparent resin 2 (FIG. 10(c)). After that, a third transparent resin 9 is caused to adhere closely to the photooxidation-processing-applied opposite surface (FIG. 10(d)). Furthermore, the three pieces of transparent resins are joined with each other by irradiating the closely-adhering portion with the laser light (FIG. 10(e)). When the ultraviolet-region laser light is used, the transparent and three-layered joined structure can be formed by carrying out the photooxidation processings onto the joining interfacial-surface sides, and repeating the pressurizations and the laser-light irradiations.

Figure 11:
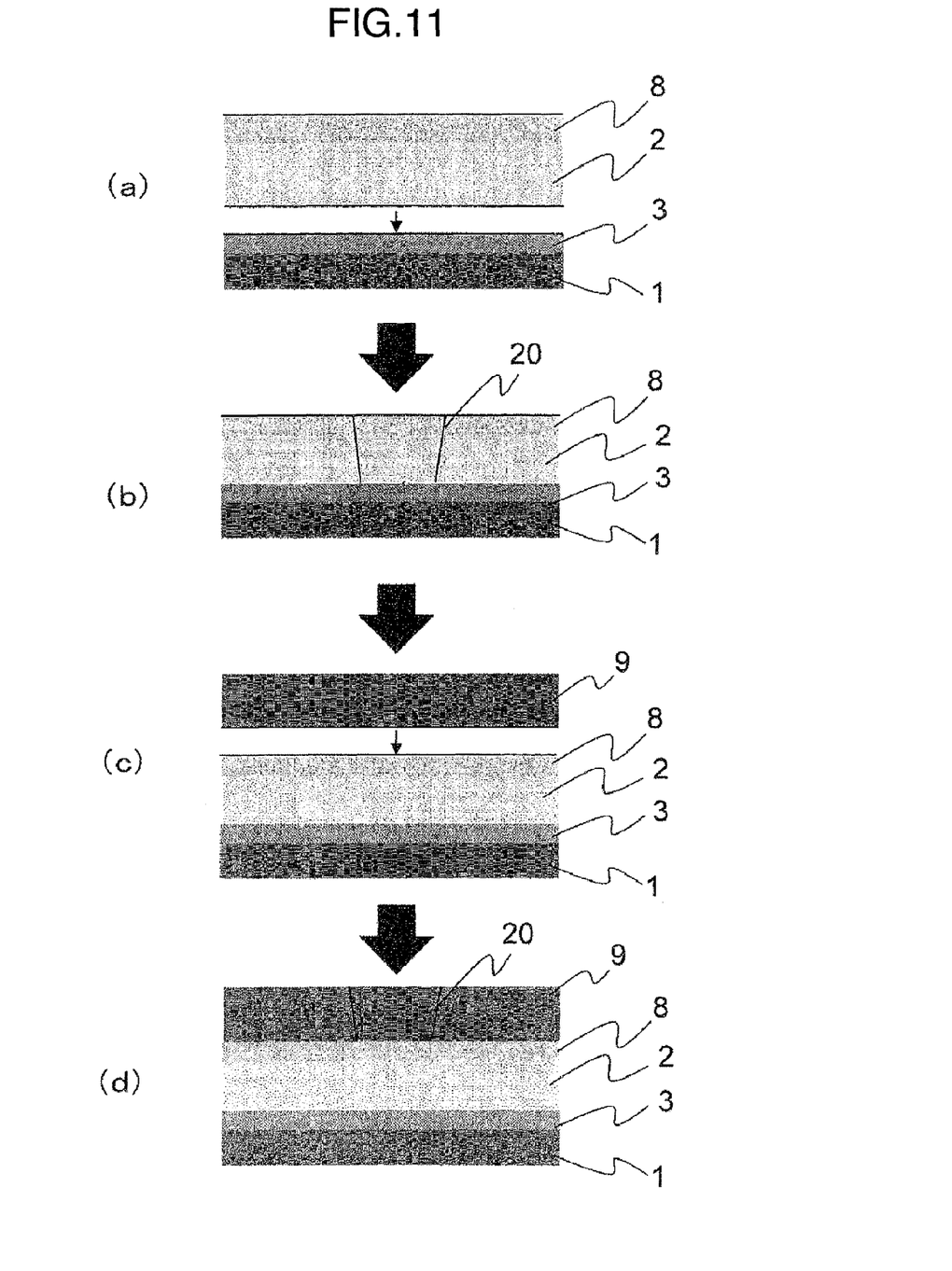

In contrast thereto, the laser light-source used in a laser welding method illustrated in FIG. 11 is a laser light-source for emitting the ultrashort pulse-wave laser light. The first transparent resin 2 onto which the photooxidation processing is applied is caused to adhere closely to the second transparent resin 1 onto which the photooxidation processing is applied (FIG. 11(a)). Moreover, these transparent resins are welded by irradiating the closely-adhering portion with the ultrashort pulse-wave laser light (FIG. 11(b)). After that, the third transparent resin 9 is caused to adhere closely onto the photooxidation-processing-applied opposite surface to the joined surface of the first transparent resin 2 (FIG. 11(c)). Furthermore, the three pieces of transparent resins are joined with each other by irradiating the closely-adhering portion with the laser light (FIG. 11(d)). This laser welding method brings about a merit of making it possible to form the three-layered joined structure as follows: Namely, in the state where the three layers are pressurized, the nonlinear absorption is caused to occur by focusing the focal point only on each joining portion onto which the photooxidation processing is applied. On account of this merit, it is effective enough just to carry out the photooxidation processings to the layers in batch. This brings about an excellent merit in a point of being capable of omitting the processing steps required.

Also, these welding methods are not limited to the formation of the three-layered structure. Namely, these methods also allow the formation of the three-layered-or-more multilayered structure.

Embodiment 6

Figure 12:
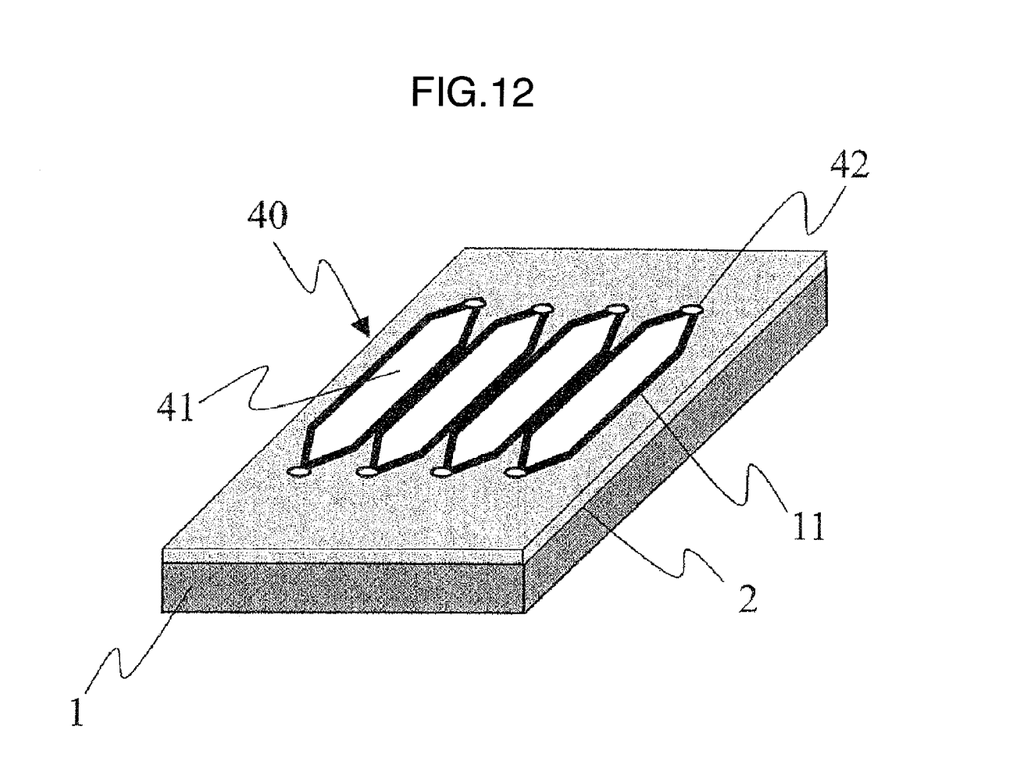
FIG. 12 is a schematic diagram for illustrating a DNA-sequencer-used flow cell for which the application of the laser joining method of the present invention is assumed.

FIG. 12 is a perspective view for illustrating an embodiment of the laser welding method of the present invention, which is used when sealing the surroundings of flow-channel potions 41 of a DNA-sequencer-used flow cell 40. In particular, in the case of bio-related or medical-care-related parts, it is desired to join mutually transparent resins with each other, and to eliminate outgases and foreign substances as much as possible. Accordingly, the case of these parts is the most effective target to which the present method can be applied. Also, laser-light-used products such as optical pickup, camera module, and micro projector use a plurality of lenses therein. Consequently, the present method becomes employable for directly joining these plurality of lenses with each other. Not only for the products described so far, as long as the targets are products where mutually transparent raw materials are to be joined with each other, the present method is effective for these products in general.

As having been explained so far, the configurations described in the first to sixth embodiments are effective for not only the transparent thermoplastic resins, but also transparent thermosetting resins. Furthermore, inorganic materials such as glass, semiconductor, mineral, and the like are also included within the target range of these configurations.

REFERENCE SIGNS LIST

1 . . . second transparent thermoplastic resin, 2 . . . first transparent thermoplastic resin, 3 . . . photooxidized layer of joining interfacial surface of second transparent thermoplastic resin, 4 . . . oxidized layer of joining interfacial surface of first transparent thermoplastic resin, 5 . . . microscopic concave/convex portions of joining interfacial surface of second transparent thermoplastic resin, 6 . . . microscopic concave/convex portions of joining interfacial surface of first transparent thermoplastic resin, 7 . . . intermediate member, 8 . . . photooxidized layer formed on joining interfacial surface of first transparent thermoplastic resin for being joined with third transparent thermoplastic resin, 9 . . . third transparent thermoplastic resin, 10 . . . welding interfacial surface, 11 . . . welded portion, 20 . . . laser light, 30 . . . pressurization member, 40 . . . DNA-sequencer-used flow cell, 41 . . . flow channels, 42 . . . holes.

The invention claimed is:

1. A laser joining method, comprising:
   a photooxidation-processing step of applying a photooxidation processing onto a second light-translucent resin; and
   a joining step of causing the photooxidation-processing applied surface of the second light-translucent resin to be opposed to a first light-translucent member, and joining the first light-translucent member and the second light-translucent resin with each other by irradiating the joining surface of the first light-translucent member and the second light-translucent resin with laser light;
   wherein the laser-light irradiation is performed over an area that is wider than an area of the second light-translucent resin over which the photooxidation processing has been applied.

2. The laser joining method according to claim 1, wherein the first light-translucent member and the second light-translucent resin are transparent, transmittances of visible light and infrared-region light through the first light-translucent member and the second light-translucent resin being equal to 70% or more.

3. The laser joining method according to claim 2, wherein the transmittances of the visible light and the infrared-region light through the second light-translucent resin after being subjected to the photooxidation processing are equal to 70% or more as compared with the transmittances before being subjected to the photooxidation processing.

4. The laser joining method according to claim 2, wherein the laser light is ultraviolet-region laser light whose wavelength is equal to 400 nm or less.

5. The laser joining method according to claim 2, wherein the laser light is ultrashort pulse-wave laser light whose pulse width is equal to 10 ps or less.

6. The laser joining method according to claim 1, wherein transmittances of visible light and infrared-region light through the second light-translucent resin after being subjected to the photooxidation processing are equal to 70% or more as compared with the transmittances before being subjected to the photooxidation processing.

7. The laser joining method according to claim 6, wherein the laser light is ultraviolet-region laser light whose wavelength is equal to 400 nm or less.

8. The laser joining method according to claim 1, wherein the laser light is ultraviolet-region laser light whose wavelength is equal to 400 nm or less.

9. The laser joining method according to claim 1, wherein the laser light is ultrashort pulse-wave laser light whose pulse width is equal to 10 ps or less.

10. The laser joining method according to claim 1, wherein
    the photooxidation processing is an UV ozone processing or excimer processing where ultraviolet-region light is used.

11. The laser joining method according to claim 1, wherein, at the joining step, the first light-translucent member and the second light-translucent resin are joined with each other while the joining surface of the first light-translucent member and the second light-translucent resin is being pressurized.

12. The laser joining method according to claim 1, wherein
the first light-translucent member is a first light-translucent resin,
the first light-translucent resin and the second light-translucent resin being thermoplastic resins, the thermoplastic resins being composed of one and the same-type material, and being equipped with mutual miscibility.

13. The laser joining method according to claim 1, wherein
the first light-translucent member is a first light-translucent resin,
the first light-translucent resin and the second light-translucent resin being thermoplastic resins, the thermoplastic resins being composed of different-type materials, and being not equipped with mutual miscibility,
the first light-translucent resin and the second light-translucent resin being joined with each other in a state where the surface energy on the joining-surface side of the first light-translucent resin is made higher than the surface energy on the joining-surface side of the second light-translucent resin.

14. The laser joining method according to claim 1, wherein
the first light-translucent member is a first light-translucent resin,
the first light-translucent resin and the second light-translucent resin being thermoplastic resins, the thermoplastic resins being composed of different-type materials, and being not equipped with mutual miscibility,
the first light-translucent resin and the second light-translucent resin being joined with each other in a state where the glass transition temperature or melting point of the second light-translucent resin is higher as compared with the glass transition temperature or melting point of the first light-translucent resin.

15. The laser joining method according to claim 1, wherein
the first light-translucent member is a first light-translucent resin,
the laser joining method, further comprising:
a surface quality-improvement processing step of carrying out a surface quality-improvement processing onto the first light-translucent resin, the surface quality-improvement processing being any one of plasma processing, corona processing, and laser processing,
the photooxidation processing applied surface of the second light-translucent resin, and the surface of the first light-translucent resin onto which the surface quality-improvement processing is carried out being laser-joined with each other.

16. The laser joining method according to claim 1, wherein
the first light-translucent member is a first light-translucent resin,
the photooxidation processing being applied onto the joining surface of the first light-translucent resin as well.

17. The laser joining method according to claim 1, wherein
the first light-translucent member and the second light-translucent resin are joined with each other in a state where microscopic concave/convex portions are formed on the joining interfacial-surface side of at least the second light-translucent resin.

18. The laser joining method according to claim 1, wherein
the first light-translucent member and the second light-translucent resin are joined with each other by performing the laser-light irradiation from the side of the first light-translucent member, and in a state where the optical absorptance of the second light-translucent resin is made higher than that of the first light-translucent member.

19. A laser joining method, comprising:

a photooxidation-processing step of applying a photooxidation processing onto a second light-translucent resin; and a joining step of causing the photooxidation-processing applied surface of the second light-translucent resin to be opposed to a first light-translucent member, and joining the first light-translucent member and the second light-translucent resin with each other by irradiating the joining surface of the first light-translucent member and the second light-translucent resin with laser light;

wherein the first light-translucent member and the second light-translucent resin are joined with each other by performing the laser-light irradiation in a state where light-translucent and liquid-state substance is deployed between the first light-translucent member and the second light-translucent resin.

* * * * *